United States Patent
Kasama et al.

(10) Patent No.: US 7,401,342 B2
(45) Date of Patent: Jul. 15, 2008

(54) OPTICAL DISK CONVEYANCE SYSTEM FOR PREVENTING SCRATCHING UPON INSERTION AND REMOVAL

(75) Inventors: Hiroshi Kasama, Tokyo (JP); Youhide Kido, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 367 days.

(21) Appl. No.: 10/974,204

(22) Filed: Oct. 27, 2004

(65) Prior Publication Data

US 2005/0091676 A1 Apr. 28, 2005

(30) Foreign Application Priority Data

Oct. 28, 2003 (JP) .......................... P2003-367650

(51) Int. Cl.
*G11B 17/04* (2006.01)
*G11B 33/02* (2006.01)

(52) U.S. Cl. .................................... 720/622
(58) Field of Classification Search ................ 720/619, 720/620–625
See application file for complete search history.

(56) References Cited

U.S. PATENT DOCUMENTS

| | | | | |
|---|---|---|---|---|
| 5,022,023 | A * | 6/1991 | Toyoguchi | 720/624 |
| 5,467,334 | A * | 11/1995 | Kim | 720/625 |
| 5,719,844 | A * | 2/1998 | Abe | 720/625 |
| 6,314,073 | B2 * | 11/2001 | Horie | 720/628 |
| 6,542,453 | B1 * | 4/2003 | Yamada et al. | 720/616 |
| 6,735,131 | B2 * | 5/2004 | Vangal | 365/201 |
| 6,751,179 | B2 * | 6/2004 | Fujiwara et al. | 720/623 |
| 6,779,190 | B2 * | 8/2004 | Akatani et al. | 720/624 |
| 7,281,256 | B2 * | 10/2007 | Huang | 720/624 |
| 2003/0043721 | A1 | 3/2003 | Akatani et al. | |

FOREIGN PATENT DOCUMENTS

| | | |
|---|---|---|
| EP | 2000-228044 A | 8/2000 |
| JP | 8-138298 | 5/1996 |
| JP | 2000-57665 A | 2/2000 |
| JP | 2003-59151 A | 2/2003 |
| JP | 2003-77198 A | 3/2003 |

OTHER PUBLICATIONS

European Search Report for EP 04 02 5529, dated Nov. 20, 2007.

* cited by examiner

*Primary Examiner*—Brian E. Miller
*Assistant Examiner*—Matthew G Kayrish
(74) *Attorney, Agent, or Firm*—RatnerPrestia (57) ABSTRACT

In order to prevent any scratches from occurring at a back-end edge of a disk when a feeding roller finishes ejecting the disk and a user tries to grab and draw out the disk, a second ridge disposed on a side of an opening for inserting the disk of two ridges located on both sides of the feeding roller is made up of a straight part without any gradient for a specified range in a central part, a first tapered part with a sharp gradient within a specified range on both sides thereof, and a second tapered part with a gentle gradient on both sides further thereto. When the disk is drawn out for ejecting, only the back-end circumferential periphery of the disk point-contacts the first tapered part with a sharp gradient and accordingly it is possible to prevent any damage to the disk due to any possible line contact between the disk and the ridges.

15 Claims, 6 Drawing Sheets

OPTICAL DISK CONVEYANCE SYSTEM FOR PREVENTING SCRATCHING UPON INSERTION AND REMOVAL

BACKGROUND OF THE INVENTION

1. Field of the Invention

The present invention relates to an optical disk conveying device for holding and conveying an optical disk with the help of a rotatable feed roller and an optical disk reproducing device having this optical disk conveying device.

2. Description of the Prior Art

There has been a strong demand in the market for downsizing and thinning of optical disk reproducing devices, in particular optical disk reproducing devices for automobiles, and intense research and development activities are being undertaken to cope with such a demand. In order to downsize and thin optical disk reproducing devices, a system of directly holding and conveying an optical disk by means of a feed roller and disk guides is adopted, instead of the conventional system of mounting an optical disk on a tray to insert the optical disk into and eject the same from the reproducing device (refer, for example, Japanese Published Unexamined Patent Application No. Hei 8-138298).

Figure 1:
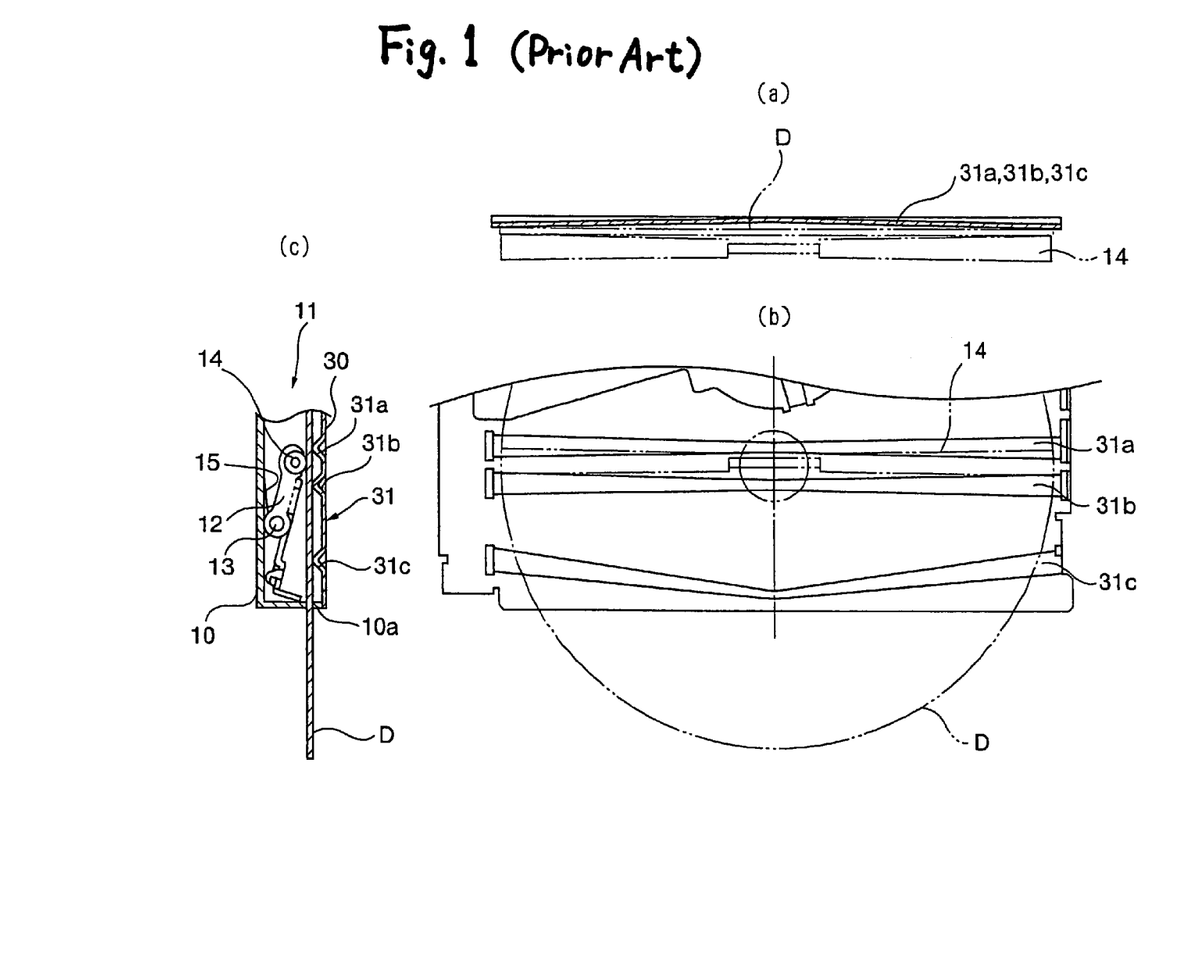
FIG. 1A is a schematic front sectional view of the disk conveying device according to a prior embodiment.
FIG. 1B is a schematic top plan view of the disk conveying device according to a prior embodiment.
FIG. 1C is a schematic sectional view of the disk conveying device according to a conventional embodiment.

FIG. 1 show the structure of a disk conveying device for a conventional optical disk reproducing device for automobiles, and FIG. 1A is a front sectional view, FIG. 1B is a top plan view and FIG. 1C is a side sectional view. In FIG. 1, a disk conveying device 11 is disposed in front of a lower chassis 10 constituting the main chassis of the device. The disk conveying device 11 includes a metal feeding plate 12 extending in the width direction of the lower chassis 10, and a rotary supporting shaft 13 fitted at the center of both sides of the feeding plate 12 and protruding outward is supported slidably in a circular direction by the lower chassis 10. At the back-end on both sides of the feeding plate 12, a rubber feeding roller 14 of an expanded diameter from the central part towards both ends are rotatably supported through a shaft by the lower chassis. The feeding plate 12 is forced to rotate clockwise by the action of a twist coil spring 15 provided around its rotary supporting shaft 13, approaches, in the normal state, a disk guide 31 forming an integral part of the upper chassis 30, and conveys a disk D inserted from an opening for disk insertion 10a by holding the same between the feeding roller 14 and the disk guide 31. The opening for disk insertion 10a is formed on the front plate of the lower chassis 10.

The disk guide 31 consists of a first ridge 31a, a second ridge 31b parallel to the former and disposed at positions facing each other on both sides of the feeding roller 14, and a third ridge 31c formed at a position close to the opening for disk insertion 10a and dogleg-shaped by slanting the central part forward and the both ends backward. The ridges 31a, 31b and 31c protrude in the dogleg shape towards the feeding roller 14 and formed in a tapered shape with the same incline so that they may approach the feeding roller 14 from the central part to the both ends. Due to the presence of the ridges, the disk D inserted from the opening for disk insertion 10a is conveyed deep into the device by the feeding roller 14 being centered by the respective ridges 31c, 31b and 31a. And at the end of conveyance, the disk D is located at the central position of the turntable that rotates the same.

Figure 2:
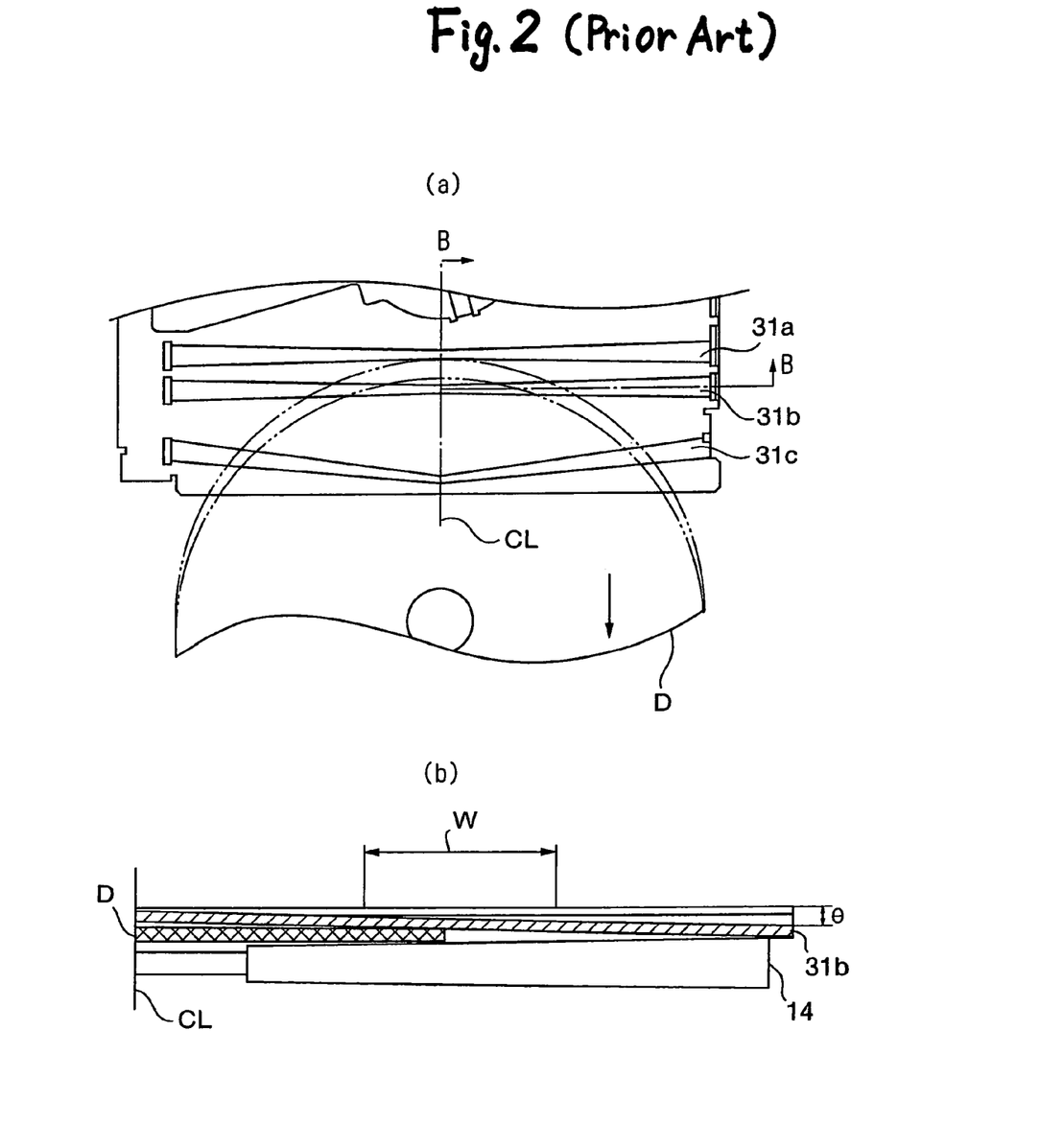
FIG. 2A is a schematic top plan view illustrating the operation of the disk guide according to a prior embodiment.
FIG. 2B is an enlarged detail along the line B-B of FIG. 2A.

However, when the conventional disk conveying device mentioned above is applied to a slim optical disk reproducing device, as shown in FIG. 2A, the back-end edge of the disk D rubs the second ridge 31b resulting in a slight scratch depending on the drawing operation of the user, when the feeding roller 14 ends ejecting the disk D, the back-end edge of the disk D comes off the first ridge 31a, and the user tries to grab the disk D to draw out the same. Such an incidence occurs when, as shown in FIG. 2B which is an enlarged detail of the section B-B of FIG. 2A, the back-end edge of the disk D, being pushed by the feeding roller 14, line-contacts the second ridge 31b within a specified range W from a central line CL (for example within a range of 27.1 mm to 37.0 mm for the central line CL) because the angle of inclination θ cannot be made sharper due to the same inclination θ that continues from the both ends to the central line (CL) on the second ridge 31b (ditto in the case of the first ridge 31a and the third ridge 31c). Such scratches are particularly problematic because of the likelihood of causing reproduction failures when the disk D is a DVD on which data is recorded on both sides. Even if the disk D is a CD or other similar media on which data is recorded only on one side, a similar problem occurs when the user commits mistakes in inserting the disk such as inserting the disk D upside down.

The present invention is made in order to solve such prior problems, and its object is to provide an optical disk conveying device capable of conveying without damaging the disk even when the device is made thinner and an optical disk reproducing device having the same.

SUMMARY OF THE INVENTION

In order to achieve the object mentioned above, the optical disk conveying device of the present invention is an optical disk conveying device for holding and conveying an optical disk between a rotatable feeding roller and disk guides approximately opposite to the feeding roller, wherein the disk guides are disposed at positions approximately in parallel with and opposite to the feeding roller, have a first ridge and a second ridge protruding towards the feeding roller, formed in a tapered shape approaching the feeding roller from a central part towards both ends, and a straight part of which a height of the ridges is approximately constant is formed in the central part of the second ridge disposed on a side of an opening for disk insertion of the ridges, and a first tapered part provided in a connected row arrangement with the straight part and having a specified gradient within a specified range towards the both sides.

By this structure, when the feeding roller finishes ejecting the disk, the back-end circumferential periphery of the disk comes off the first ridge, and the user tries to hold and draw out the disk, the back-end part of the disk is located at the low straight part of the second ridge and only the back-end circumferential periphery of the disk point-contacts the first tapered part having a relatively sharp gradient of the second ridge. Therefore, the disk does not line-contact the second ridge even when the disk is drawn out, and it will be possible to prevent the disk from being damaged thereby.

The aforementioned object and advantage of the present invention will be clearer by referring to the following embodiments described with reference to the drawings.

DESCRIPTION OF THE PREFERRED EMBODIMENTS

Figure 3:
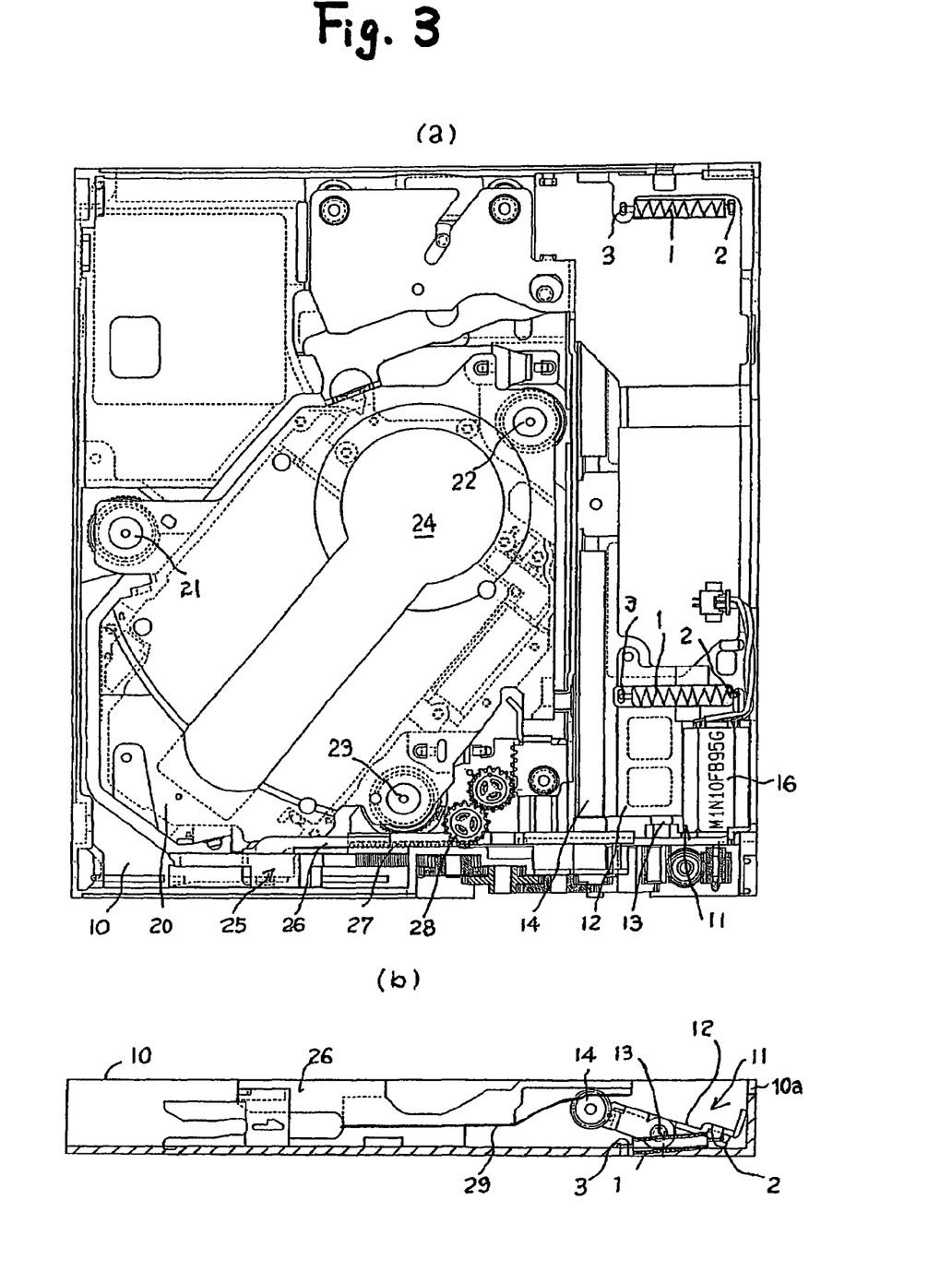
FIG. 3A is a schematic top plan view illustrating the lower chassis and suspension chassis assembly and the feeding roller in operation of the optical disk reproducing device according to an embodiment of the present invention.
FIG. 3B is a schematic side view of FIG. 3A.
Figure 4:
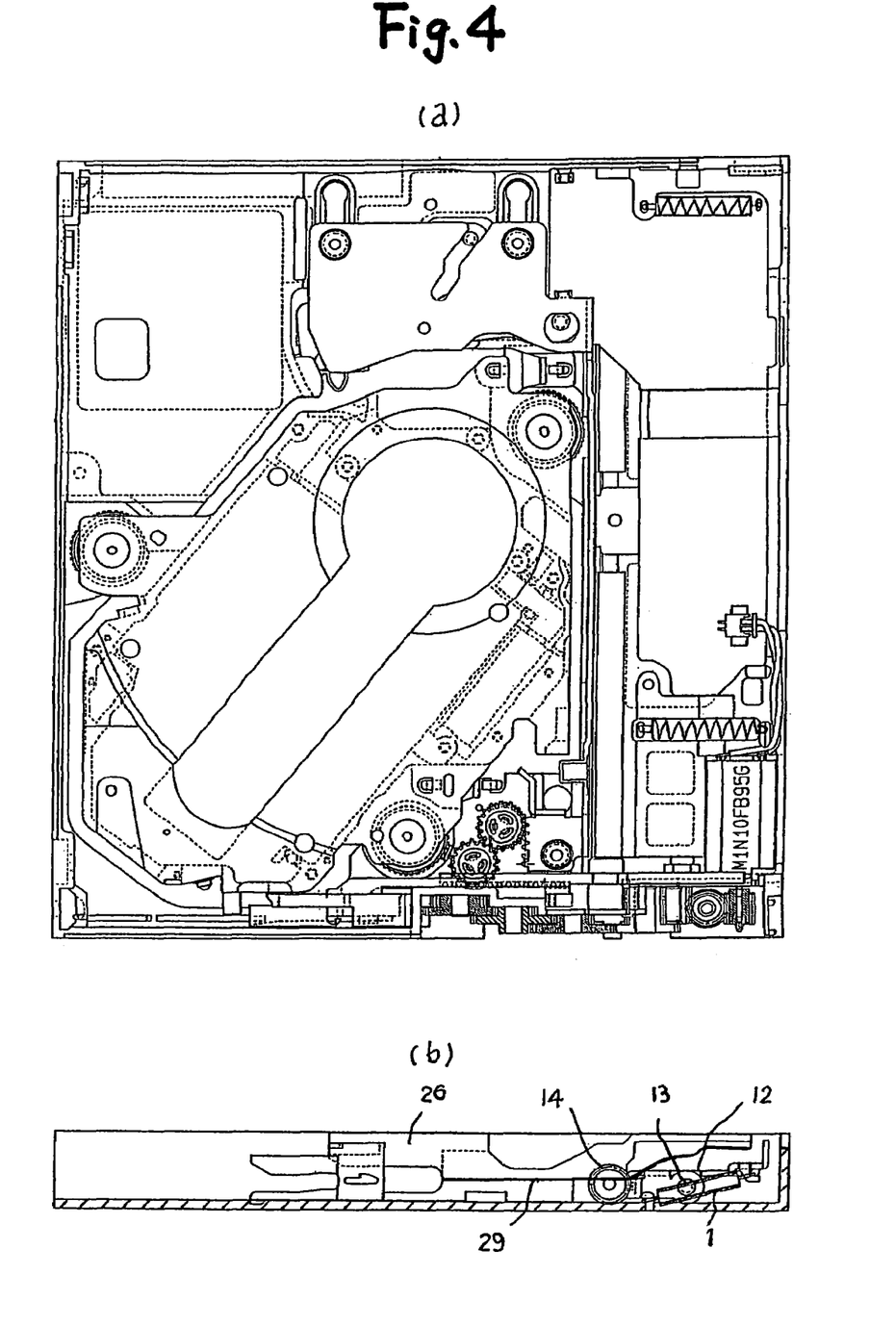
FIG. 4A is a schematic top plan view illustrating the feeding roller in a standby position according to the embodiment of the present invention.
FIG. 4B is a schematic side view of FIG. 4A.

The embodiments of the present invention shall be described below with reference to drawings. FIG. 3A is a schematic top plan view showing the lower chassis and suspension chassis assembly in operation of the optical disk reproducing device for automobiles according to the embodiment of the present invention and FIG. 3B is a schematic side view of the lower chassis assembly. FIG. 4A is a schematic top plan view illustrating the feeding roller of the device in a position separate from the disk, and FIG. 4B is a schematic side view of the same. For the convenience of description, the same code used in the description of the prior art shown in FIG. 1 are used for the similar components except for the upper chassis. In FIG. 3 and FIG. 4, a disk conveying device 11 is disposed in front of the lower chassis 10. The disk conveying device 11 includes a metal feeding plate 12, and a rotary supporting shaft 13 provided at the center of both sides of the feeding plate 12 and protruding outward is supported movably in a circular direction by the lower chassis 10. At the back-end on both sides of the feeding plate 12, a rubber feeding roller 14 of an expanded diameter from the central part towards both ends are rotatably supported through a shaft by the lower chassis. The feeding plate 12 is forced to rotate clockwise by the action of two helical extension springs 1 provided on both sides. One end of each of the helical extension springs 1 is supported by a locking piece 2 provided at the back of the front end of the feeding plate and the other end is supported by a locking piece 3 provided on the bottom of the lower chassis 10 so that the load may pass near the lower part of the rotary shaft 13 of the feeding plate 12.

The suspension chassis 20 is supported by the lower chassis 10 through three dumper mechanisms 21, 22, and 23 each made up of an oil dumper and a coil spring. A turntable mechanism and an optical pickup mechanism are fitted on the opening 24 of the suspension chassis 20, and a clamp arm of a disk clamp mechanism for pushing the disk towards the turntable is rotatably fixed through a suspension lock mechanism 25 provided on the inside surface of one side.

Figure 5:
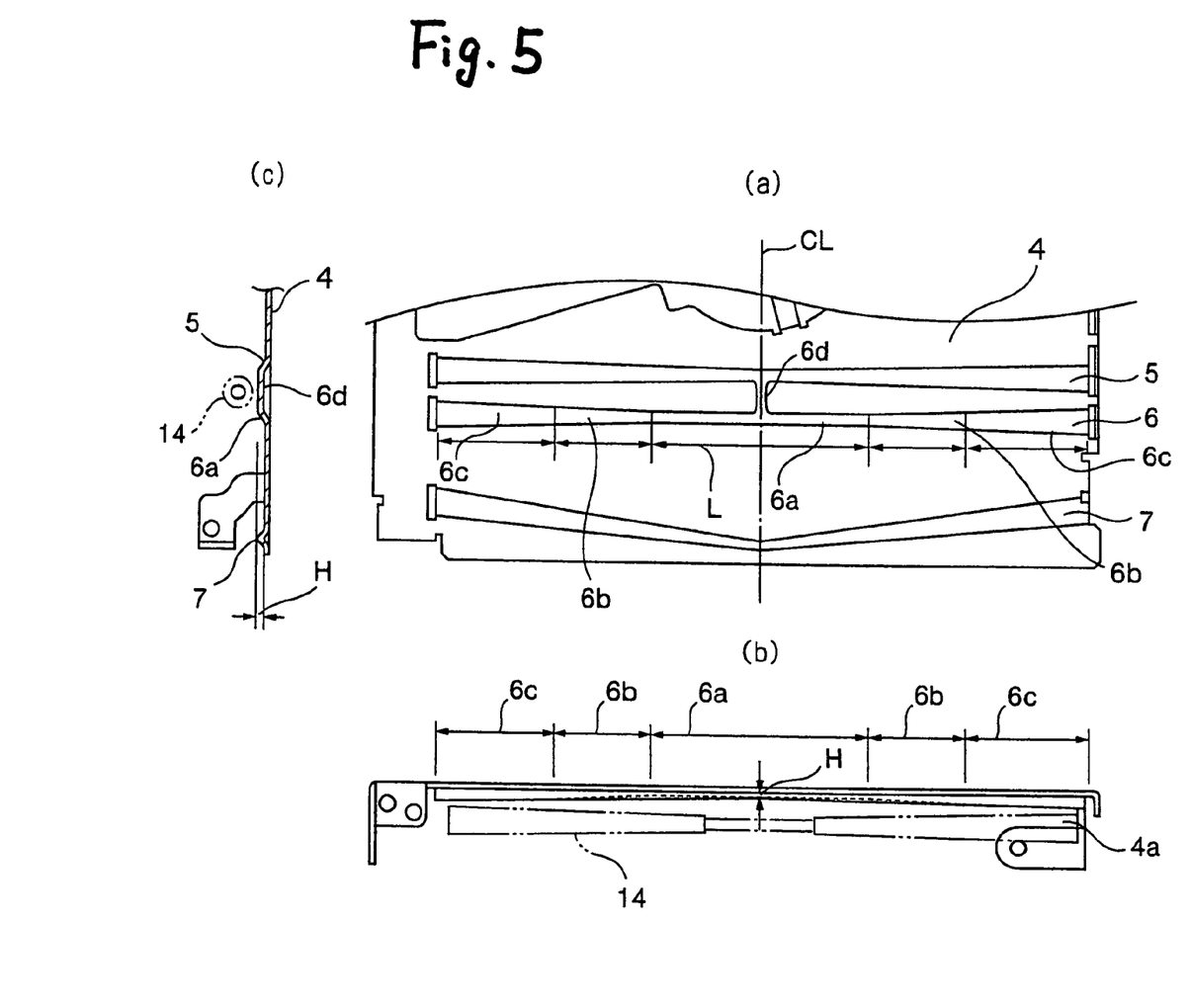
FIG. 5A is a partial top plan view of the upper chassis according to the embodiment of the present invention.
FIG. 5B is a front view of the upper chassis according to the embodiment of the present invention.
FIG. 5C is a partial left side view of the upper chassis according to the embodiment of the present invention.

And now the structure of the disk guide according to the embodiment of the present invention will be described below. FIG. 5A is a fragmentary top plan view of the upper chassis of the optical disk reproducing device according to an embodiment of the present invention, FIG. 5B is a front view thereof and FIG. 5C is a sectional view as seen from the left side representing a view obtained by turning FIG. 3 by 90°. On the back of the front side of the metal upper chassis 4, three ridges 5, 6, 7 are formed to serve as disk guides. The first ridge 5 and the second ridge 6 among these three ridges are arranged in parallel at positions facing each other on both sides of the feeding roller 14, and the third ridge 7 is formed in the dogleg shape with the both ends slanting backward from the central part located forward at a position near the opening for insertion of the disk 4a formed on the front part of the upper chassis 4 (corresponding to the opening for insertion of the disk 10a in FIG. 3).

The second ridge 6 on the opening for insertion of the disk side among the two parallel ridges 5, 6 is made up of a straight part 6a having a slightly protruding height in the chevron shape at the central part towards the feeding roller 14 and yet having a constant height and width, the first tapered part 6b respectively continuing to protrude in the chevron shape towards the feeding roller 14 on both sides of the straight part 6a so that it may approach the feeding roller 14 from the central part towards both sides, and the second tapered part 6c inclining further on both sides so that the ridge may approach the feeding roller 14. The height H of the second ridge 6 from the surface of the upper chassis 4 is about 0.35 mm, and the range L of the straight part 6a is respectively 21.2 mm on one side of the central line CL and 42.4 mm on both sides. The width of the first tapered part 6b is approximately 17.5 mm, and its gradient is about 3.2. The gradient of the second tapered part 6c is approximately 1.4 similarly to that of the first ridge 5. The height H of the first ridge 5 and the third ridge 7 on the central line CL is about 0.35 mm similarly to the height of the straight part 6a of the second ridge 6, and the respective tapered part is inclined at approximately 1.4. The first ridge 5 and the second ridge 6 are linked by a bridge 6d on the central line CL. These ridges 5, 6, and 7 are formed by drawing a sheet metal to the shape of the upper chassis 4, and the back of the feeding roller 14 is coated with a coating material having a small friction coefficient in order to prevent scratches from developing due to the coarseness of the chassis surface.

And now the operation of the optical disk reproducing device according to the embodiment of the present invention will be described below. In FIG. 3, when the user inserts a disk into the device through the opening for disk insertion 10a, the disk conveying motor 16 starts rotating in response to a signal from the photo sensor having detected the insertion of a disk, and causes the feeding roller 14 to rotate. And the disk, being centered into the central part, is drawn into the device by the three tapered ridges 5, 6, and 7 serving as disk guides on the feeding roller 14 and the upper chassis 4. When the disk is drawn into the device, a suspension lock mechanism 25 operates at the back edge of the disk, and a suspension lock component 26 provided on one side of the suspension chassis 20 slides forward and its rack 27 engages with a pinion 28. This causes the rack 27 slide forward by the action of the pinion 28 driven by the disk conveying motor 16. And the feeding roller 14 is pushed downward by the action of the cam surface 29 formed on the lower surface of the front edge, and the feeding plate 12 rotates counterclockwise centered around the rotary supporting shaft 13. Then, the feeding roller 14 separates itself from the upper chassis 4, and as shown in FIG. 4, its position is maintained by the bottom surface of the cam 29, and the suspension chassis 20 is maintained in a suspended state. At the same time, the clamp arm descends and the disk clamp positions the disk on the turntable, and the disk contents are reproduced by the action of an optical pickup mechanism.

When the reproduction of the disk ends and an eject button is pressed, the disk conveying motor rotates in the reverse direction, and a reverse operation to the above takes place. To begin with, the clamp arm rises and the disk clamp separates itself from disk, the pinion 28 slides the rack 27 and the suspension lock component 26 backward, the feeding plate 12 rises by the action of the cam surface 29, and the feeding plate 12 rises causing the feeding roller 14 to come into contact with the disk and ejects the disk to a position whereat the disk can be grasped from the outside. At this time, an end of a helical extension spring 1 for forcing to rotate the feeding plate 12 is supported by a locking piece 2 provided at the front edge side of the feeding plate 12 and the other end is supported by a locking piece 3 provided on the bottom surface of the lower chassis 10 so that the load may pass near the lower part of the rotary supporting shaft 13 of the feeding plate 12. Therefore, when the feeding plate 12 is moved circularly in the direction of separating itself from the disk guide, it can be moved circularly with a little force, and a motor of a small output can be used.

Figure 6:
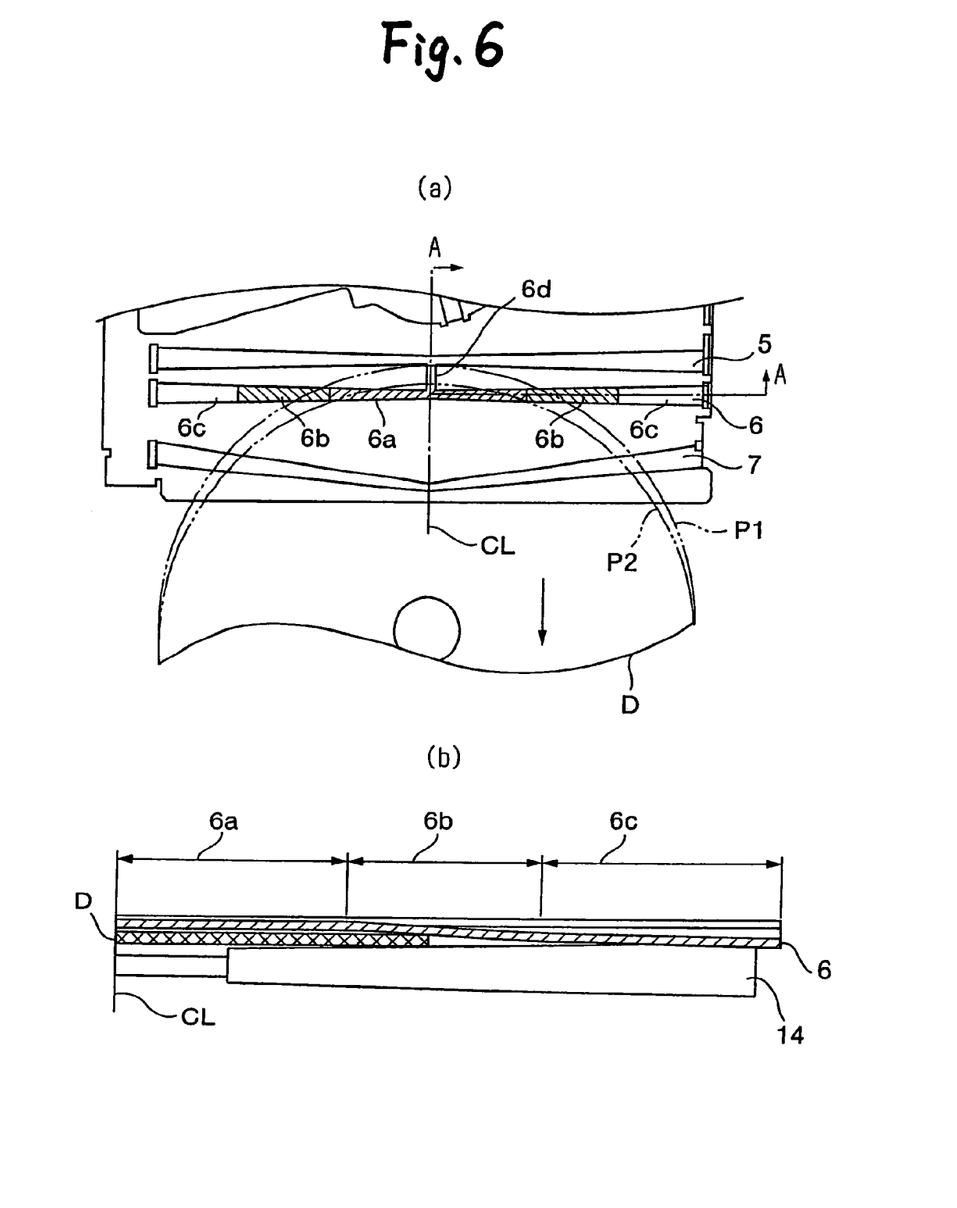
FIG. 6A is a schematic top plan view showing the operation of the disk guide according to the embodiment of the present invention.
FIG. 6B is an enlarged sectional view along the line A-A in FIG. 6A.

And now, the action of the ridges 5, 6 constituting the disk guides in the embodiment of the present invention will be described with reference to FIG. 6. When the feeding roller 14 finishes ejecting the disk D, the back-end circumferential periphery of the disk D leaves the first ridge 5, and the user tries to grab and draw out the disk D, at the position P1, only the back-end circumferential periphery of the disk D point-contacts the first tapered part 6b with a relatively important gradient of the second ridge 6, and therefore it is possible to prevent any damage to the disk D. In addition, at the position P2, the back edge of the disk D is positioned at the straight part 6a without gradient in the central part of the second ridge 6 and the back-end circumferential periphery of the disk D is in contact with the bridge 6d and is separated from the straight part 6a. Therefore, even if the disk D is drawn out forward, it is possible to prevent any damage to the back-end edge of the disk D.

Thus, according to the disk conveying device of the embodiment of the present invention, in view of the fact that the second ridge 6 disposed on the side of the opening for disk insertion 4a among the ridges 5, 6, 7 serving as the disk guides integrally formed with the rotatable feeding roller 14 and the upper chassis 4 is made up of a straight part 6a for the prescribed length L in the central part, the first tapered part 6b having a relatively important gradient gradually approaching the feeding roller 14 for the specified range W on both sides thereto and the second tapered part 6c having a reduced gradient on both sides further thereto, when the feeding roller 14 finishes ejecting the disk D and the user tries to grab and draw out the disk D, at the position P1 of the disk D, the back-end circumferential periphery of the disk D point-contacts the first tapered part 6b having a relatively important gradient of the second ridge 2, it is possible to prevent any possible damages to the back edge of the disk D. In addition, at the position of P2 where the disk D has advanced, the back-end circumferential periphery of the disk D is located at the straight part 6a having a low height H and is in point contact with the bridge 6d. Therefore, even if the disk is drawn out, the disk is not damaged. Moreover, the straight part 6a is formed in the form of a rib with a low-height chevron and is connected with the bridge 6d, it is possible to maintain its strength when a thin sheet metal is used for the upper chassis 4.

In addition, it is possible to realize a high-performance and thin optical disk reproducing device by combining such a disk conveying device with an optical disk reproducing device.

While the ridges 5, 6, 7 in the present embodiment are formed in the shape of a chevron, their shape is not limited to chevron, and may be triangular or semi-circular. And as long as it is possible to maintain the strength of the disk guide by other means, the straight part 6a of the first ridge 5 may be a flat part with no protrusion. In this case, the elimination of protrusion can secure even more space, and such space may be more effectively used.

And in the present embodiment, the present invention is applied to the second ridge 6 among the two ridges 5, 6 on both sides of the feeding roller. However, in the case of a device having a similar ridge between the second ridge 6 and the third ridge 7, the present invention may be applied to that ridge.

While the disk guide is formed integrally with the upper chassis in the present embodiment, it is possible to use disk guides separate from the upper chassis. For example, when a material of a small coefficient of friction is used to form disk guides, it will be unnecessary to coat the same with a coating material.

As described above, the optical disk conveying device according to the present invention includes the second ridge disposed on the side of the opening for disk insertion for the disk guide having a straight part without inclination within a prescribed range in the central part and a tapered part more sharply inclined on both sides thereof. Accordingly, when the disk is drawn out for ejecting, only the back-end circumferential periphery of the disk point-contacts the sharply inclined tapered part, and thus it is possible to prevent damage due to line contact between the disk and the ridge. For this reason, it is useful as an optical disk conveying device for holding and conveying an optical disk between the rotatable feeding roller and the disk guides and as an optical disk reproducing device.

During the ejection operation of the disk by the feeding roller, it is possible to prevent damage to the disk surface because only the circumferential periphery of the disk point-contacts the second tapered part.

Depending on the range of the straight part or the angle of inclination of the first tapered part of the second ridge, when the back-end edge of the disk has come off the first ridge, the back-end edge of the disk sometimes comes into contact with the low straight part of the second ridge. In such a case, it is possible to prevent damage to the back-end edge of the disk by the straight part of the second ridge by providing a bridge of the same height at the central part for connecting the first ridge and the second ridge, because only the back-end circumferential periphery of the disk contacts the tapered part having a relatively important gradient. It is also possible to reinforce the strength of the disk guides by this bridge.

It is possible to form the straight part of the second ridge into a flat part by the material, thickness of the disk guides, the taper angle of each of the ridges and so forth.

It is also possible to integrate the disk guides with the upper chassis when the upper chassis is worked with a sheet metal.

It is possible to realize a high-performance and thin optical disk reproducing device because it is possible to prevent damage from occurring on disks by reducing the taper angle of the ridge of disk guides.

The present invention is characterized in that the second ridge serving as a disk guide and disposed on the side of the opening for disk insertion is made up of a straight part without inclination within a specified range in the central part and tapered parts within a specified range on both sides thereof with a relatively important inclination, and that when the disk is drawn out for ejecting the disk, only the back-end circumferential periphery of the disk point-contacts the tapered parts having a relatively important inclination. Such a structure enables to prevent any damage from occurring due to the line contact between the disk and the ridges and to realize a high-performance and thin optical disk reproducing device.

The present invention has been described on the basis of the preferred embodiment shown in the drawings. However, it is apparent that any person skilled in the art can easily think of variations and modifications without deviating from the principle and philosophy of the present invention. The present invention includes such examples of variations and modifications.

What is claimed is:

1. An optical disk conveying device for holding and conveying an optical disk between a rotatable feeding roller and disk guides approximately opposite to said feeding roller, wherein said disk guides have;
   a first ridge disposed at positions approximately in parallel with and opposite to said feeding roller, protruding toward said feeding roller, and formed in a tapered shape approaching said feeding roller and longitudinally extending from a central part toward both ends thereof; and
   a second ridge disposed on a side of an opening for disk insertion from the first ridge, protruding towards said feeding roller, and formed in a tapered shape approaching said feeding roller and longitudinally extending from a central part towards both ends thereof;
   a first tapered part longitudinally extending from the central part towards both ends of the second ridge is formed on the second ridge, a gradient of said first tapered part is larger than a gradient of the tapered part longitudinally formed on said first ridge; and
   said first tapered part is formed in a manner that when the disk is drawn out of said optical disk conveying device for being ejected, only the back-end circumferential periphery of the disk point-contacts said first tapered part.

2. The optical disk conveying device according to claim 1, wherein said second ridge comprises a second part provided in a connected row arrangement with and on said both sides of said first part and having a gentler than said first part and the approximately same gradient as said gradient of said first ridge.

3. the optical disk conveying device according to claim 2, wherein said first ridge and said second ridge are connected by a bridge at the central parts of said first ridge and said second ridge at approximately the same height.

4. The optical disk conveying device according to claim 1, wherein said first ridge and said second ridge are connected by a bridge at said central parts of said first ridge and said second ridge at approximately the same height.

5. The optical disk conveying device according to claim 1, wherein said disk guides are integrated with an upper chassis of said optical disk reproducing device.

6. The optical disk conveying device according to claim 1, wherein said first part is formed such that when the disk is drawn out of said optical conveying device for being ejected, only the back-end circumferential periphery of the disk point-contacts said first part.

7. The optical disk conveying device according to claim 1, wherein said second ridge further includes a second part and the first and second parts each have different gradients.

8. The optical disk conveying device according to claim 7, wherein said second ridge further includes a third part and the first, second and third parts each have different gradients.

9. An optical disk reproducing device comprising an optical disk conveying device for holding and conveying an optical disk between a rotatable feeding roller and disk guides approximately opposite to said feeding roller, wherein said disk guides have;
   a first ridge disposed at positions approximately in parallel with and opposite to said feeding roller, protruding toward said feeding roller, and formed in a tapered shape approaching said feeding roller and longitudinally extending from a central part towards both ends thereof; and
   a second ridge disposed on a side of an opening for disk insertion from the first ridge, protruding towards said feeding roller, and formed in a tapered shape approaching said feeding roller and longitudinally extending from a central part towards both ends thereof;
   a first tapered part longitudinally extending from the central part towards both ends of the second ridge is formed on the second ridge, a gradient of said first tapered part is larger than a gradient of the tapered part longitudinally formed on said first ridge; and
   said first tapered part is formed in a manner that when the disk is drawn out of said optical disk conveying device for being ejected, only the back-end circumferential periphery of the disk point-contacts said first tapered part.

10. The optical disk conveying device according to claim 9, wherein said first ridge and said second ridge are connected by a bridge at said central parts of said first ridge and said second ridge at approximately the same height.

11. The optical disk conveying device according to claim 9, wherein said straight part of said second ridge is formed into a flat part without protrusion.

12. The optical disk conveying device according to claim 9, wherein said disk guides are integrated with an upper chassis of said optical disk reproducing device.

13. The optical disk conveying device according to claim 9, wherein said second ridge comprises a second part provided in a connected row arrangement with and on said both sides of said first part and having a gentler than said first part and the approximately same gradient as said gradient of said first ridge.

14. The optical disk conveying device according to claim 13, wherein said first ridge and said second ridge are connected by a bridge at the central parts of said first ridge and said second ridge at approximately the same height.

15. The optical disk conveying device according to claim 13, wherein said straight part of said second ridge is formed into a flat part without protrusion.

* * * * *